United States Patent [19]

Sakaguchi

[11] Patent Number: 5,330,130
[45] Date of Patent: Jul. 19, 1994

[54] TWO-BEARING REEL HAVING SELECTOR MECHANISM FOR SELECTING BETWEEN TOGGLE MODE AND MOMENTARY MODE

[75] Inventor: Noboru Sakaguchi, Tondabayashi, Japan

[73] Assignee: Shimano Inc., Osaka, Japan

[21] Appl. No.: 28,598

[22] Filed: Mar. 8, 1993

Related U.S. Application Data

[63] Continuation of Ser. No. 680,853, Apr. 5, 1991, abandoned.

[30] Foreign Application Priority Data

Apr. 11, 1990 [JP] Japan ............... 2-38624[U]

[51] Int. Cl.⁵ ............................................. A01K 89/15
[52] U.S. Cl. ..................................................... 242/261
[58] Field of Search ........................... 242/259-262, 242/268

[56] References Cited

U.S. PATENT DOCUMENTS

| | | | |
|---|---|---|---|
| 4,379,530 | 4/1983 | Kobayashi | 242/261 |
| 4,513,930 | 4/1985 | Sato | 242/261 |
| 4,593,869 | 6/1986 | Yasui et al. | 242/261 |
| 4,798,355 | 1/1989 | Kaneko | 242/261 |
| 4,824,046 | 4/1989 | Emura et al. | 242/261 |
| 4,850,550 | 7/1989 | Aoki | 242/261 |
| 5,058,823 | 10/1991 | Emura et al. | 242/261 |
| 5,163,635 | 11/1992 | Sato | 242/261 |

*Primary Examiner*—Daniel P. Stodola
*Assistant Examiner*—Michael R. Mansen
*Attorney, Agent, or Firm*—Dickstein, Shapiro & Morin

[57] ABSTRACT

A two-bearing reel capable of selectively providing a toggle mode and a momentary mode. The reel has a first toggle spring for operating a clutch mechanism to an end of either an engaging stroke or a disengaging stroke, the first toggle spring having a dead point between the first position and the second position, and a second toggle spring for providing an urging force to the clutch mechanism or to a control unit of the clutch mechanism, the urging force being weaker than that of the first toggle spring. The second toggle spring has a dead point beyond the second position towards the disengaging stroke of the clutch mechanism. The selector mechanism effects the mode selection by switching over the urging force of the first toggle spring between an effective state and an ineffective state.

3 Claims, 4 Drawing Sheets

TWO-BEARING REEL HAVING SELECTOR MECHANISM FOR SELECTING BETWEEN TOGGLE MODE AND MOMENTARY MODE

This application is a continuation of application Ser. No. 07/680,853 filed Apr. 5, 1991, now abandoned.

BACKGROUND OF THE INVENTION

1. Field of the Invention

The present invention relates to a two-bearing reel, and more particularly to a reel of this type including a control member operable into a first position for engaging a clutch mechanism interposed between a spool and a handle and a second position for disengaging the clutch mechanism for rendering the spool freely rotatable and a selector mechanism for selectively providing a toggle mode where at least the clutch mechanism is maintained at the engaged state thereof with operation of the control member from the first position to the second position and a momentary mode where with release of the operation of the control member the control member is returned to the first position for returning the clutch mechanism to the engaged state.

2. Description of the Related Art

A typical conventional reel of the above-described type is known from e.g. a Japanese laid-open patent gazette No. 60-78526 or from a Japanese laid-open utility model gazette No. 62-198972. With the former convention, a coil spring is provided through one terminal end thereof for urging the control member, whereas the other terminal end of the spring is supported to a controlled member which position is variable. With this, during use of the reel, the toggle mode and the momentary mode are switched over therebetween through selection of a position of the controlled member. With the latter convention, the reel has a return spring for constantly urging the control member to its home position and a toggle spring having a stronger urging force than the return spring for toggling the control member by overriding the urging force of the return spring. Then, through operation of the control member for switchably providing the first state where the toggle spring is effective and the second state where the toggle spring is ineffective, the toggle mode and the momentary mode are switched over therebetween.

The controlled member of the former convention and the control member of the latter convention respectively correspond to the selector mechanism described above.

These conventions have drawbacks to be described next.

That is, with the former convention, since the construction uses a single spring, an operation in either mode becomes disabled if a trouble occurs in the spring, e.g. inadvertent disengagement at the spring engaging portion.

With the latter convention, on the other hand, the construction allows operation in the other mode when operation in one mode becomes disabled due to trouble in the spring used for this mode. Yet, since the spring for the momentary mode constantly provides the urging force in the direction for preventing shift to the toggle mode for disengaging the clutch mechanism, the disengaged state of the clutch mechanism can not be maintained stably without careful setting of the urging force of the momentary mode spring. Therefore, both the conventions still have room for improvement.

Taking the above-described state of the art into consideration, the primary object of the present invention is to provide an improvement of the two-bearing reel of the above-described type which improvement effectively avoids totally inoperable condition of the reel and which reliably provides both of the toggle mode and the momentary mode.

SUMMARY OF THE INVENTION

For accomplishing the above-noted object, a two-bearing reel, according to the present invention, comprises: a spool; a handle for rotating the spool; a clutch mechanism disposed between the spool and the handle; a control member operable into a first position for engaging the clutch mechanism and a second position for disengaging the clutch mechanism for rendering the spool freely rotatable; and a selector mechanism for selectively providing a toggle mode where at least the clutch mechanism is maintained at the disengaged state thereof with operation of the control member from the first position to the second position and a momentary mode where with release of the operation of the control member the control member is returned to the first position for returning the clutch mechanism to the engaged state; the control member and the clutch mechanism being so correlated to each other that the control member at the second position thereof remains further operable in a direction for disengaging the clutch mechanism while maintaining the disengaged state of the clutch mechanism; a first toggle spring for operating the clutch mechanism to an end of either an engaging stroke or a disengaging stroke of the clutch mechanism, the first toggle spring having a dead point between the first position and the second position; a second toggle spring for providing an urging force to the clutch mechanism or to a control unit of the clutch mechanism, said urging force being weaker than an urging force of the first toggle spring, the second toggle spring having a dead point beyond the second position towards the disengaging stroke of the clutch mechanism; and the selector mechanism effects the mode selection by switching over the urging force of the first toggle spring between an effective state and an ineffective state.

Functions and effects of the above-described construction will be described next.

These features of the present invention can be embodied as shown in FIGS. 1 through 5, for instance. With selection of the toggle mode by operation of the selector mechanism D, as shown in FIGS. 1 and 2, the clutch mechanism C is maintained either at the disengaged state or the engaged state by the urging force of the first toggle spring 30. Also, if the handle 7 is rotated in a direction for winding a fishing line when the clutch mechanism C is maintained at the disengaged state, the control member 6 is returned to its first position P1 beyond the dead point DP1 of the first toggle spring 30 through operative connection of a gear 10 and a return member 28. And, at the same time, the clutch mechanism C is returned to its engaged state. In this condition, by the urging force of the second toggle spring 29, a free end of the return member 28 is departed from the gear 10. Incidentally, if the clutch mechanism C is disengaged in this toggle mode, the urging force of the second toggle spring 29 acts in the direction for disengaging the clutch mechanism C.

On the other hand, with selection of the momentary mode by further operation of the selector mechanism D, as illustrated in FIG. 3, only the urging force of the second toggle spring 29 is applied to the control member 6 to urge this member 6 towards the first position P1. That is, according to the features of the present invention, through settings of the positions of the dead points DP1 and DP2 of the two toggle springs 30, 29, in the toggle mode, the urging forces of the two toggle springs 30, 29 are applied and maintained in the direction for the stroke end of the engaging stroke and the disengaging stroke, respectively. In addition, in this toggle mode, even if there occurs a trouble in the second toggle spring 29, the reel can still effect a toggle operation. Also, for selecting the momentary mode, the selection can be readily effected by releasing the urging force of the first toggle spring 30. In this momentary mode, the reel remains operable even when there occurs trouble in the first toggle spring 30.

Incidentally, according to the present invention, the first toggle spring 30 is used for effecting a toggle operation. And, during this toggle operation (i.e., the toggle mode), in association with rotation of the handle 7, the second toggle spring 29 is utilized for automatically returning the control member 6 to the first position P1. Then, by setting the position of the dead point DP2 of this second toggle spring 29 for the control member 6, in the momentary mode, it becomes also possible to utilize the urging force of this second toggle spring 29 for returning the control member 6 to its home position.

Consequently, the present invention has fully achieved its intended object of providing a two-bearing type reel with the improvement which effectively avoids totally inoperable condition of the reel and which reliably provides both of the toggle mode and the momentary mode.

Further and other objects, features and effects of the invention will become more apparent from the following more detailed description of the embodiments of the invention with reference to the accompanying drawings.

BRIEF DESCRIPTION OF THE DRAWINGS

Accompanying drawings illustrate preferred embodiments of a two-bearing reel relating to the present invention; in which.

DESCRIPTION OF THE PREFERRED EMBODIMENTS

Preferred embodiments of a two-bearing reel relating to the present invention will now be described in particular with reference to the accompanying drawings.

Figure 4:
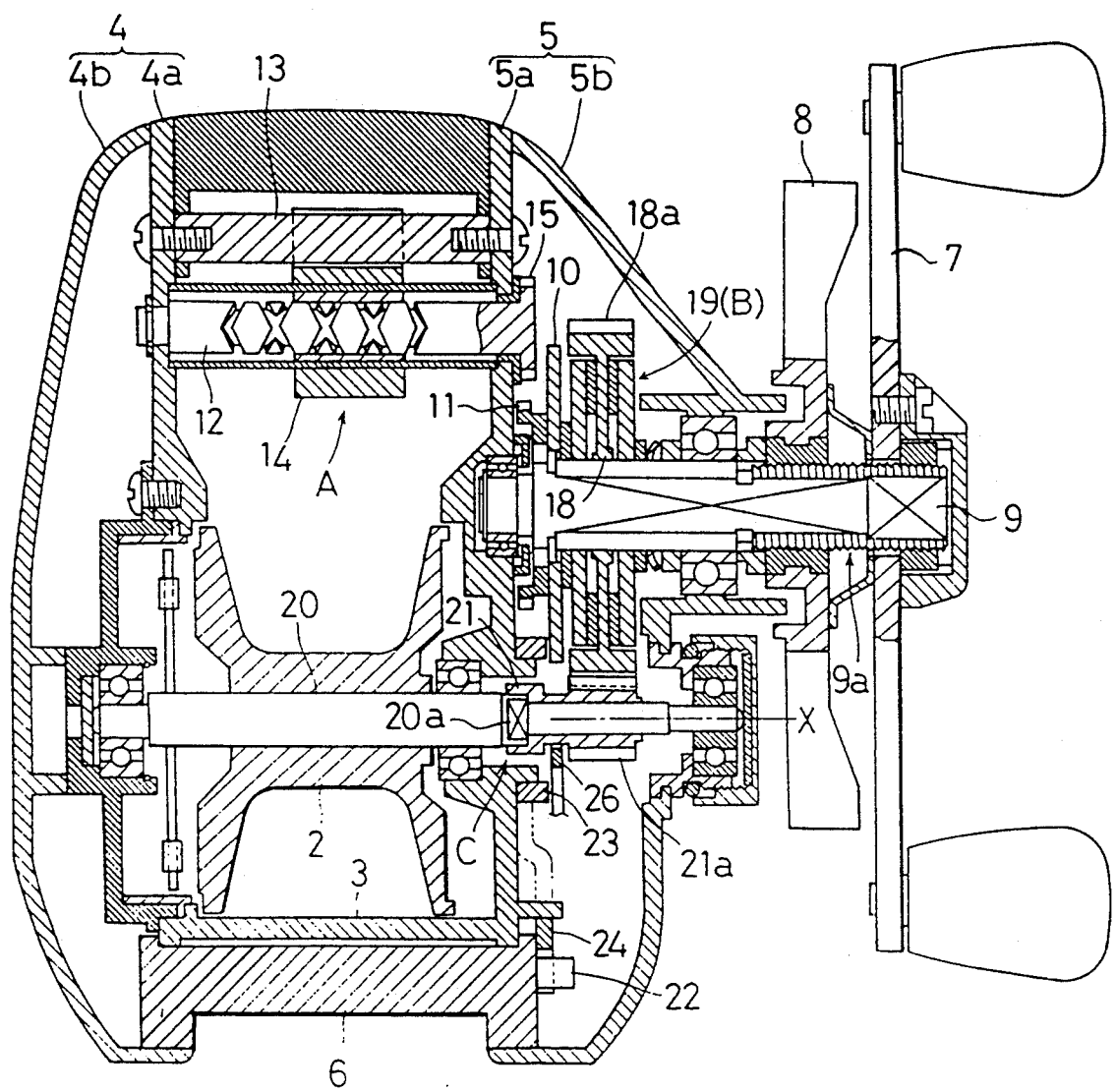
FIG. 4 is a plan view in section of the reel relating to this embodiment.
Figure 5:
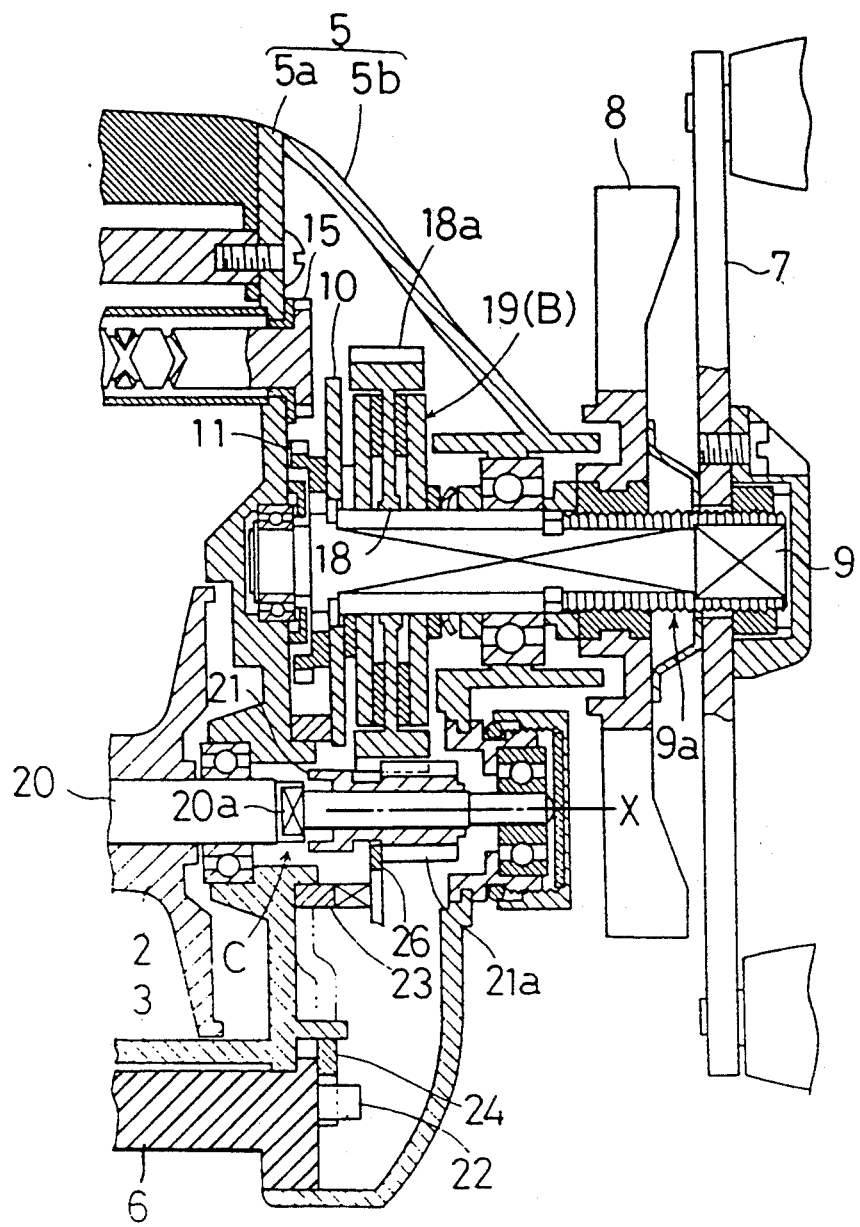
FIG. 5 is a partial section showing a condition where a clutch mechanism is disengaged.

As shown in FIGS. 4 and 5, a two-bearing reel of one embodiment of the invention includes a level-wind mechanism A, a spool 2, and a thumb rest 3 interposed between a pair of right and left side cases 4, 5 in the mentioned order at forward, middle and rear positions of a reel body, respectively as being attached to an unillustrated fishing rod. Rearwardly of the thumb rest 3, there is provided a control member 6 operable by depression to render the spool 2 freely rotatable. Further, to an outer side of the right side case 5, there are attached a wind-up handle 7 and a star-shaped drag adjustment member 8.

As shown in FIG. 4, the side cases 4 and 5 respectively include side plates 4a, 5a and outer wall members 4b, 5b for covering outer sides of the side plates 4a, 5a. A rotary shaft 9 associated with the handle 7 is extended between the right side plate 5a and the right outer wall member 5b.

The drag adjustment member 8 is screwed on a threaded portion 9a formed on an outer end of the rotary shaft 9. Whereas, at inner positions of this rotary shaft 9, there are attached a drag mechanism B, a ratchet wheel 10 (an example of a gear member) and a transmission gear 11 for transmitting force to the level-wind mechanism A.

The level-wind mechanism A has a line guide member 14 which is reciprocable along a guide rod 13 in association with rotation of a spiral shaft 12. The force from the transmission gear 11 is transmitted through an intermediate gear 16 to a gear 15 fitted on an end of the spiral shaft 12 of the level-wind mechanism A.

The ratchet wheel 10 has a plurality of radially projecting teeth 10a in its outer periphery. Further, adjacent this ratchet wheel 10, there is provided a claw member 17 constantly urged in a direction to engage the teeth 10a, so that the ratchet wheel 10 functions to prevent reverse rotation of the rotary shaft 9.

The rotary shaft 9 supports a free disc 18 having an outer gear 18a in its outer periphery. And, the drag mechanism B, disposed across the free disc 18, has friction plates 19, 19 fitted on the rotary shaft 9 for applying friction force thereto. Accordingly, the friction force is adjustable by adjustably rotating the drag adjustment member 8.

The spool 2 has a spool shaft 20 rotatable with this spool 2; and an engaging portion 20a is formed at an intermediate position of this spool shaft 20. Further, the spool shaft 20 loosely supports a slide element 21 slidable to engage the engaging portion 20a and having an input gear 21a engageable with the output gear 18a of the free disc 18. Accordingly, if the handle 7 is rotated when the slide element 21 is engaged with the engaging portion 20a, the spool 2 is rotated to take up a fishing line thereabout.

The above-described, slide element 21 and the engaging portion 20a together constitute a clutch mechanism C. For casting the fishing line from the reel, the slide element 21 is slid into a position shown in FIG. 5 for disengaging the clutch mechanism C. Then, as the fishing rod is swung, the spool 2 effects free rotation as being pulled by tension of the fishing line, thus feeding the line from the reel.

With the reel of this particular embodiment, the setting of the spool 2 for the free rotation, i.e. disengagement of the clutch mechanism C is effected by a depression operation of the control member 6. Next, the construction of this control member 6 will be more particularly described.

The control member 6 is supported to the right and left plates 4a, 5a to be vertically movable relative thereto. The control member 6 has a projecting pin 22 at a lateral end thereof. On the other hand, an arm 23a of a cam disc 23 rotatably supported on the spool shaft 20 to be rotatable about an axis of this shaft 20 is operatively connected with a control element 24 having its rear end portion depressed by the projecting pin 22 of the control member 6 and its intermediate portion guided by an arcuate guide element 24a.

Figure 1:
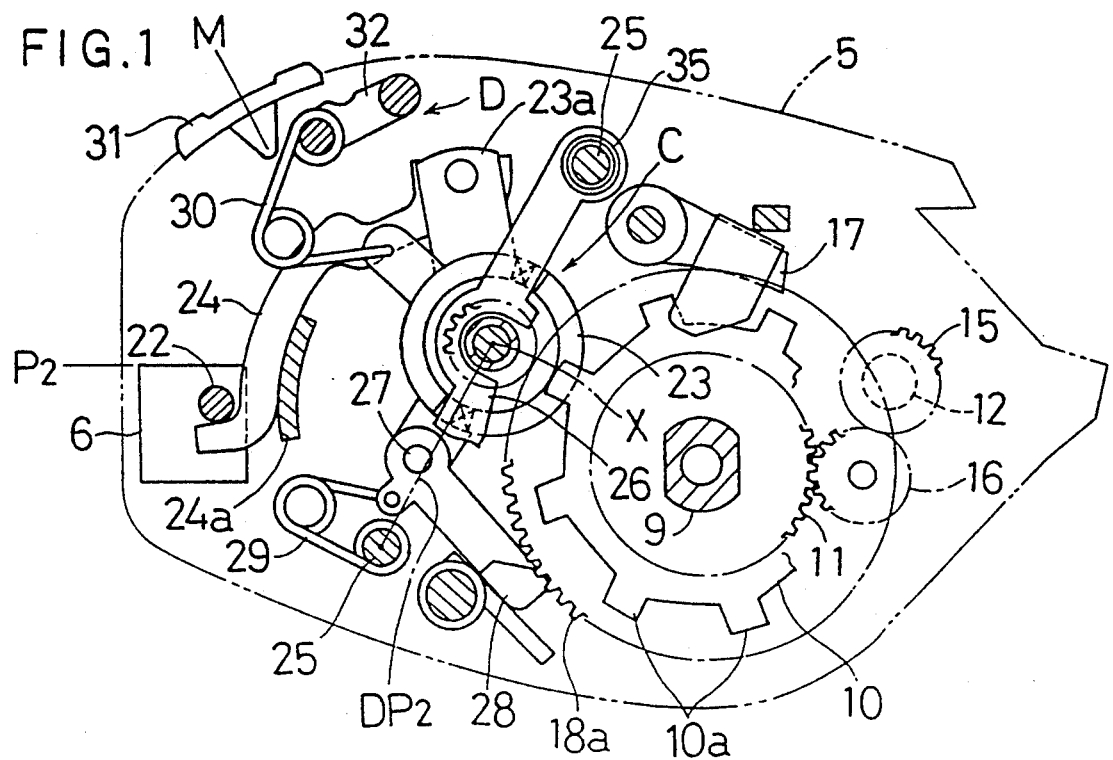
FIG. 1 is a side view showing a control unit of a reel relating to one embodiment in which a control member is set to its first position under a toggle mode.
Figure 3:
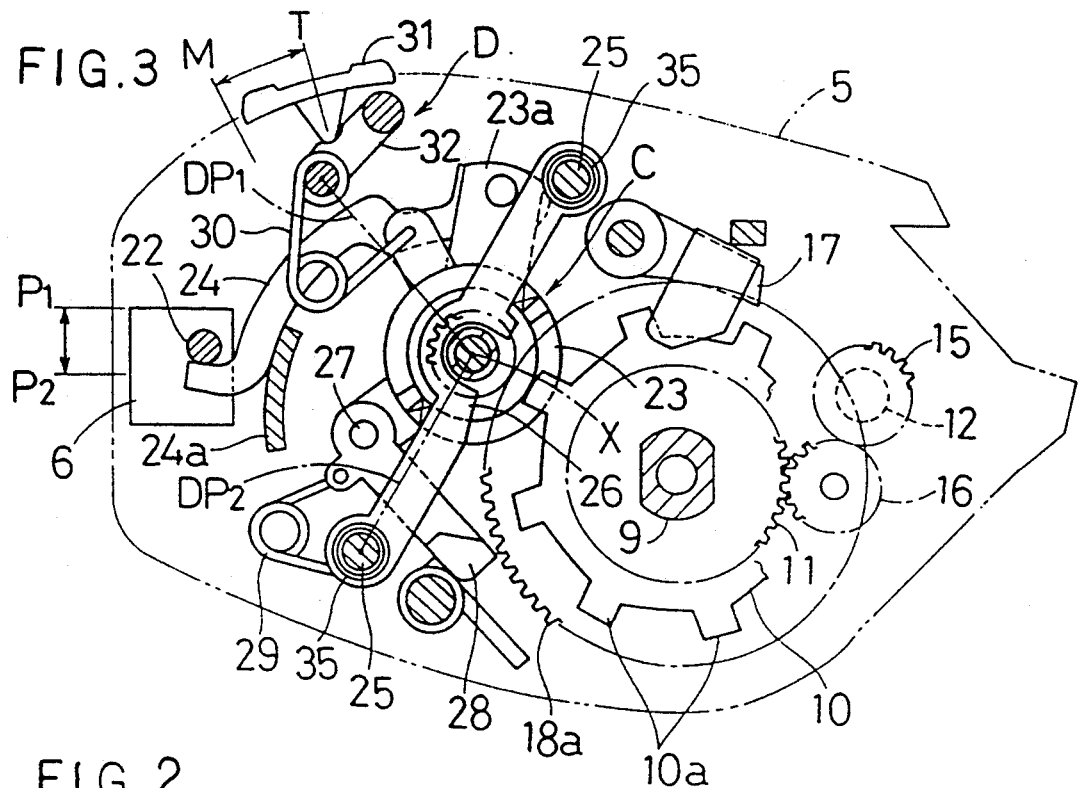
FIG. 3 is a side view showing the control unit in which the control member is set to the second position under a momentary mode.
Figure 2:
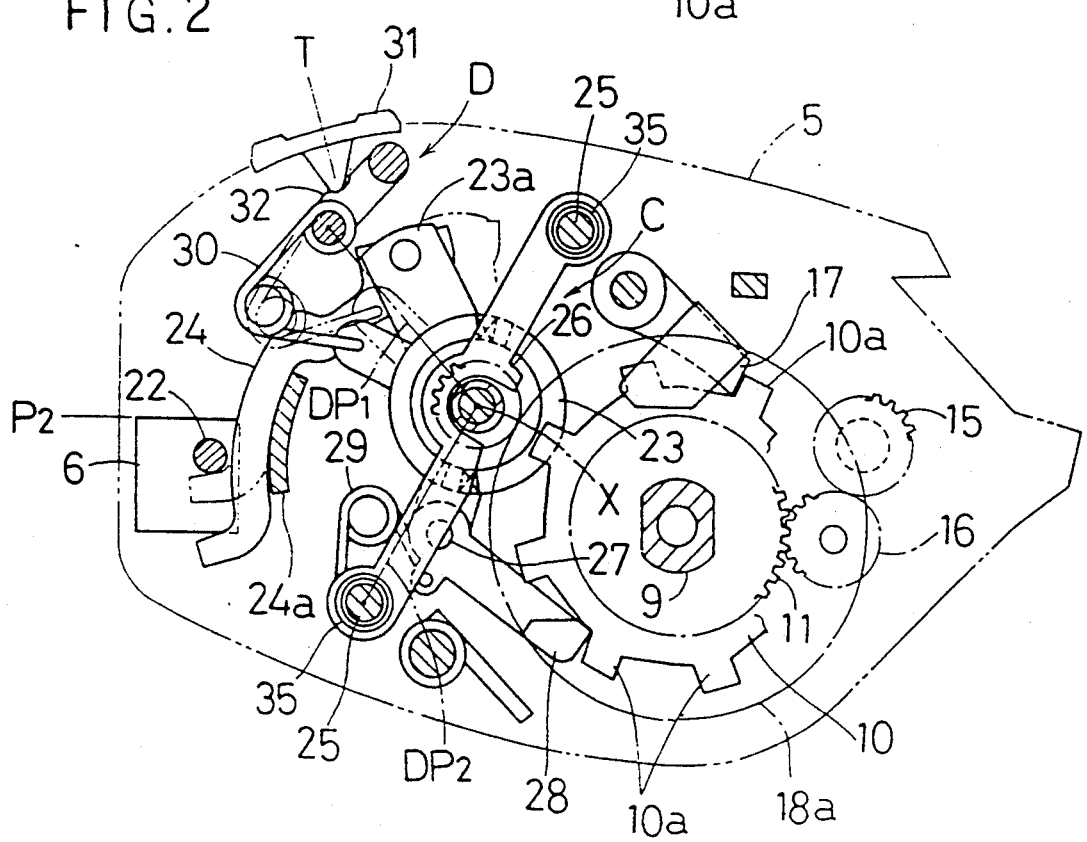
FIG. 2 is a side view showing the control unit in which the control member is set to its second position under the toggle mode.

On the other hand, as shown in FIGS. 1 through 3, the slide element 21 is engaged with a shifter 26 movable along a pair of shafts 25, 25 disposed in parallel with and at upper and lower positions relative to the spool shaft 20. To the cam disc 23, there is pivotally supported a return element 28 through a support shaft 27 extending parallel with a pivot axis X of this cam disc 23. Further, a second toggle spring 29 having a relatively weak urging force is provided for switching over the return element 28 between a position engaging the teeth 10a of the ratchet wheel 10 and a further position disengaged therefrom.

the shifter 26 is constantly urged by coil springs 35, 35 fitted respectively on the shafts 25, 25 in the direction for engaging the clutch mechanism C.

The position of the control member 6 for engaging the clutch mechanism C and the further position of this member 6 for disengaging the clutch mechanism C will be referred to, hereinafter, as a first position P1 and a second position P2, respectively. That is, the reel of the present invention further includes a selector mechanism D for selectively providing a toggle mode where at least the clutch mechanism C is maintained at the disengaged state thereof with operation of the control member 6 from the first position P1 to the second position P2 and a momentary mode where with release of the operation of the control member 6 the control member 6 is returned to the first position P1 for returning the clutch mechanism C to the engaged state thereof.

That is, the cam disc 23 of the clutch mechanism C is switchable between an engaging range for engaging the clutch mechanism C and a disengaging range for disengaging the clutch mechanism C. Further, when the control member 6 is set to the second position P2, the cam disc 23 is operated to a middle point in the disengaging range. Also, this cam disc 23 is engaged with one end of a first toggle spring 30 for pivoting this cam disc 23 to an end of the engaging range or of the disengaging range. The other end of this first toggle spring 30 is engaged with a selector mechanism D having a selector lever 31 supported to the outer wall member 5b of the right side case 5 and a selector member 32 operated by the selector lever 31, such that the selector mechanism D selectively provides a condition where the urging force of the first toggle spring 30 is allowed to affect the cam disc 23 and a further condition where the urging force is not allowed to affect the disc 23.

More particularly, for the former condition, the selector lever 31 is set to a toggle mode position T shown in FIG. 1. For the latter condition, the selector lever 31 is set to a momentary mode position M shown in FIG. 3. Further, the first toggle spring 31 has a dead point DP1 at a position corresponding to a middle point in the operational stroke of the control member 6. Thus, under the condition where the urging force of the first toggle spring 30 is allowed effective, this urging force maintains the clutch mechanism C at either the engaged condition or the disengaged condition.

With the urging force of the first toggle spring 30 being effective, if the control member 6 is operated to the second position P2, as illustrated in FIG. 2, as the control member 6 and the control element 24 are placed in abutment with each other, the urging force of the first toggle spring 30 moves the cam disc 23 to an end of the disengaging range beyond its pivotal position corresponding to the second position P2. When the second toggle spring 29 moves beyond a dead point DP2 at a middle position beyond the above pivotal position, a free end of the return element 28 is brought into engagement with the teeth 10a of the ratchet wheel 10.

Incidentally, under this engagement between the return element 28 and the ratchet wheel 10 (i.e. the clutch mechanism C is disengaged to allow free rotation of the spool 2), if the handle 7 is rotated in a direction for taking up the fishing line, the rotational force of the ratchet wheel 10 is transmitted to the cam disc 23 through the return element 28. Then, as this cam disc 23 is returned, against the urging force of the first toggle spring 30, to the pivotal position beyond the dead point DP1 of the first toggle spring 30, the control member 6 too is returned to the first position P1 together with this returning pivotal movement of the cam disc 23 to the end of the engaging range.

When the selector lever 31 is set to the momentary mode position M, the urging force of the second toggle spring 29 alone is allowed to affect the cam disc 23 and the control member 6 in the direction for engaging the clutch mechanism C, i.e. the direction for returning the control member 6 to the first position P1. Moreover, the second toggle spring 29 is not moved beyond the dead point DP2 even when the control member 6 is operated to the second position P2. Therefore, when the control member 6 is operated to the second position P2, the clutch mechanism C is disengaged. Also, when the operating force is released from the control member 6, the clutch mechanism C is engaged and also the control member 6 is returned to the first position P1.

As described above, with the reel of the present invention, through selection of either the toggle mode or the momentary mode by operation of the selector mechanism D, the user can engage or disengage the clutch mechanism C under a desired condition.

Figure 6:
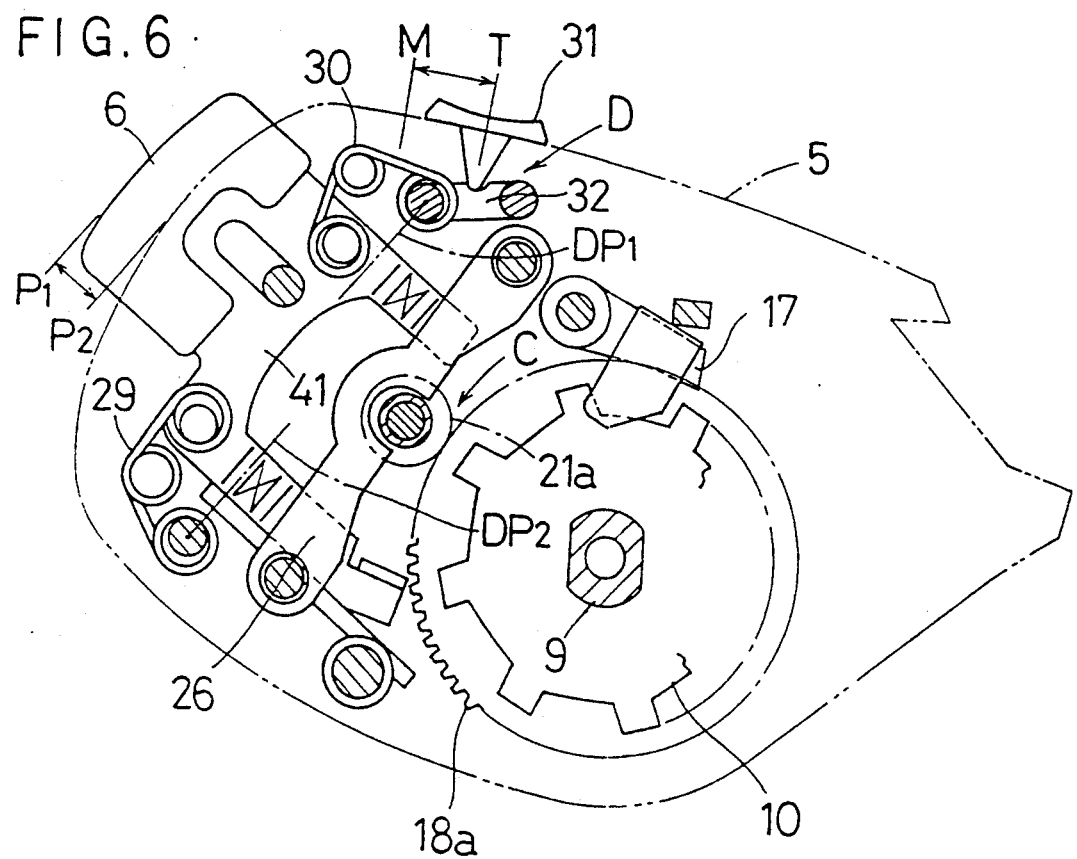
FIG. 6 is a side view of a control unit of a reel relating to a further embodiment of the invention.

In place of the construction of the foregoing embodiment, the present invention can be applied to a further construction shown in FIG. 6, where the clutch mechanism C is engaged and disengaged through a slide operation type control mechanism 41 associated with the control member 6. In this alternate construction, the urging forces of the first and second toggle spring 30, 29 are applied to the control mechanism 41, and the selector mechanism D is provided for selectably providing the toggle mode or the momentary mode through switching over the effectiveness of the urging force of the first toggle spring 30.

Incidentally, in the drawing of this alternate embodiment, the same or equivalent elements and members of those in the foregoing embodiment are denoted with the same reference marks and numerals.

Further, the first and second toggle springs may comprise coil springs. And, it is also conceivable for the first toggle spring to exert its urging force to the connection with the control member.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A two-bearing reel comprising:
   right and left side cases;
   a spool;
   a spool shaft;
   a handle for rotating said spool;
   a transmission system for transmitting torque between said spool and said handle, said transmission system including a clutch mechanism, said clutch mechanism having a cam disk, said cam disk being rotatable between engaging and disengaging positions for engaging and disengaging said clutch mechanism, respectively, said spool being freely rotatable when said clutch mechanism is disengaged;
   a control element engageable with said cam disk, and a control member contacting said control element, said control member being movable between first and second control positions, said clutch mechanism being engaged when said control member is in the first control position, said clutch mechanism being disengaged when said control member is in the second control position;
   a selector mechanism movable between toggle mode and momentary mode positions, said selector mechanism including a selector lever and a selector member for selectively positioning said selector mechanism in the toggle mode and momentary mode positions;
   a first toggle spring having first and second ends, said first end being connected to said selector member, said second end being connected to said cam disk, said first toggle spring defining a first virtual dead point between said first end of said toggle spring and said spool shaft; and
   a second toggle spring having first and second ends, said first end of said second toggle spring being connected to one of said side cases, said second end of said second toggle spring being connected to said cam disk, said second toggle spring defining a second virtual dead point between said first end of said second toggle spring and said spool shaft, and wherein the urging force of said second toggle spring is weaker than the urging force of said first toggle spring; and
   wherein said cam disk is urged to the engaging position by said first and second toggle springs to engage said clutch mechanism when said selector mechanism is in the toggle mode position and said control member is in the first control position; and
   wherein said second end of said first toggle spring moves across the first dead point when the selector mechanism is in the toggle mode position and said control member is moved from the first control position to the second control position, and wherein said cam disk is rotated and said second end of said second toggle spring is moved across the second dead point by said first toggle spring when said first toggle spring moves across the first dead point and the selector mechanism is in the toggle mode position; and
   wherein said cam disk is urged to the engaging position by said second toggle spring when said selector mechanism is in the momentary mode position and said control member is in the first control position; and
   wherein said cam disk is urged to the engaging position by said second toggle spring when said selector mechanism is in the momentary mode position and said control member is in the second control position.

2. A two-bearing reel, as defined in claim 1, wherein said clutch mechanism includes an engaging portion formed on said spool shaft rotatable in unison with said spool and a slide element engageable with said engaging portion.

3. A two-bearing reel, as defined in claim 2, wherein said slide element is engaged with a shifter movable along a pair of shafts disposed in parallel with said spool shaft and at upper and lower positions relative to said spool shaft.

* * * * *